United States Patent [19]
Kokjohn

[11] 3,770,939
[45] Nov. 6, 1973

[54] ELECTRIC HEATING ASSEMBLIES

[75] Inventor: Leonard Dennis Kokjohn, Rockford, Ill.

[73] Assignee: Emerson Electric Co., St. Louis, Mo.

[22] Filed: Sept. 19, 1972

[21] Appl. No.: 290,395

[52] U.S. Cl................. 219/532, 219/364, 219/536, 337/354
[51] Int. Cl. ........................................... H05b 3/06
[58] Field of Search ..........................219/363–374, 532, 536; 337/348, 354

[56] References Cited
UNITED STATES PATENTS

| | | | |
|---|---|---|---|
| 3,111,571 | 11/1963 | De Camp | 219/364 X |
| 3,291,966 | 12/1966 | Bunting | 219/371 |
| 1,460,943 | 7/1923 | Carmean et al. | 219/363 |
| 2,712,588 | 7/1955 | Epstein | 219/374 |
| 3,111,573 | 11/1963 | Crowe et al. | 219/370 |
| 2,514,528 | 7/1950 | Wahl | 219/368 |
| 3,562,692 | 2/1971 | Bletz et al. | 337/354 |
| 3,641,312 | 2/1972 | Ammerman | 219/532 |
| 2,694,766 | 11/1954 | Ireland | 337/354 X |
| 3,470,517 | 9/1969 | Ohlemacher et al. | 337/348 |
| 3,631,525 | 12/1971 | Brasch | 219/366 |

Primary Examiner—Volodymyr Y. Mayewsky
Attorney—Michael Williams

[57] ABSTRACT

An electric heating assembly comprising a frame formed of a plurality of laterally spaced strips which support an open coil electric heating element. The heating element is formed in sinuous fashion to provide a plurality of reaches held in position to extend crosswise of the strips. Opposite ends of the heating element are electrically connected to terminals carried by the frame, and a thermostatic switch is connected in series between a terminal and the respective end of the heating element. The switch has a thermal sensor which faces and is disposed in close proximity to a reach of the heating element so as to be quickly affected by changes in heat generated by the element.

6 Claims, 1 Drawing Figure

PATENTED NOV 6 1973 3,770,939
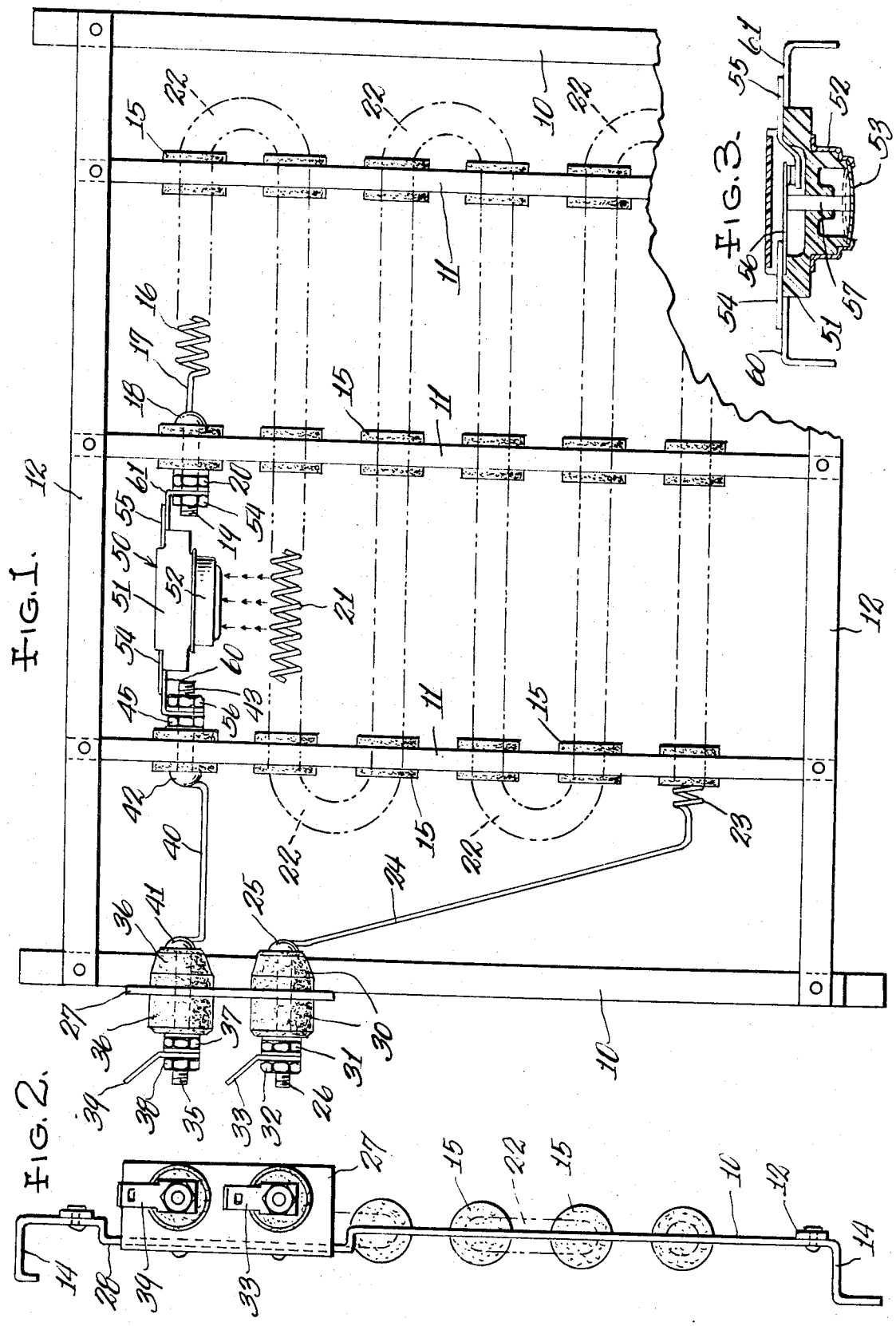

ELECTRIC HEATING ASSEMBLIES

BACKGROUND AND SUMMARY

Open coil heating elements of the type herein disclosed have heretofore been used for heating air in ducts or similar housings. When abnormal conditions arise, such as when the flow of air through a duct is impeded or halted by some unusual circumstance, the cooling effect of the flowing air is lost and the heating element will quickly reach abnormal temperatures and may create hazardous condition. This is particularly true in modern designs where more plastic or similar material is used, such as in room air conditioners and the like, since such material is sensitive to heat.

Through use of my invention, a thermostat is positioned so that it will react to abnormal temperature of the heating element in a relative short time interval, so as to interrupt current to the heating element before temperatures reach a dangerous level. Briefly, I position the heat sensor of a thermostatic switch in close proximity to the active heating portion of an electric heating element, such as a reach of an open coil unit, so as to be quickly affected by abnormal temperature and thereby interrupt current to the heater. It will be appeciated that a sheathed heating element may be used in the assembly, but it has been found that an open coil unit reacts quicker and is therefore preferable. Further, to simplify wiring and installation of the thermostat, the terminals of the thermostat are brought out of the sides of the switch housing so that the thermostat may be mounted between two spaced strips of the assembly frame, in in-line relation with an end reach of the heating element and in series with the heating element and a source of power supply.

DESCRIPTION OF THE DRAWING

In the drawing accompanying this specification and forming a part of this application, there is shown, for purpose of illustration, an embodiment which my invention may assume, and in this drawing:

FIG. 1 is a side view of an electric heating assembly, illustrating a preferred embodiment of my invention, FIG. 2 is an end view thereof, and FIG. 3 is an enlarged sectional view of a thermostatic switch which may be used in the assembly.

DESCRIPTION OF THE PREFERRED EMBODIMENT

The assembly shown in the drawings may be installed within any desired duct or housing (not shown) and comprises a frame formed of a pair of side arms 10,10 which are preferably sheet metal strips. Disposed between the side arms 10 are a plurality of support strips 11 (herein shown to be three in number). Cross strips 12 are rididly secured to the arms 10 and support strips 11 to form the frame. Opposite ends of the arms 10,10 are formed with legs 14 for the purpose of securing the frame in a duct or housing.

The strips 11 provide a support for a plurality of tubular insulators 15, and the strips and insulators may be of the type shown in U. S. Pat. No. 2,921,172, issued Jan. 12, 1960, to A. W. Hackman. An open coil heating element is shaped to sinuous formation to provide a plurality of reaches which extend through the insulators and are supported thereby. The reach 16 shown at the top of the drawing extends only between two support strips 11 and terminates in a lead 17 which is electrically connected to the head 18 of a bolt 19. The bolt passes through the adjacent insulator and a nut 20 holds the bolt firmly assembled. The top reach is integrally connected to the next lower reach 21 by a rounded end portion 22, and succeeding reaches are similarly connected. The lowest reach 23 shown in the drawing terminates in a lead 24 which is electrically connected to the head 25 of a terminal bolt 26. The bolt 26 is carried by a terminal support plate 27 and the latter is connected to an offset portion 28 of the left hand arm 10 in order to bring the axis of the bolt 26 more nearly in alignment with a plane passing through the longitudinal axes of the coil reaches. The tubular insulators 30 insulate the bolt 26 from the support plate 27, and nut 31 holds the bolt in assembled relation. A second nut 32 clamps a terminal clip 33 to the bolt and one side of a power supply line is adapted to be connected to the clip.

A second bolt 35 is carried by the terminal plate 27 and is insulated therefrom by tubular insulators 36. The axis of the bolt is nearly in alignment with the axis of the top reach 16 to simplify wiring connections. A nut 37 holds the bolt 35 in assembled relation, and a second nut 38 clamps a terminal clip 39 to the bolt 35. The other side of the power supply is adapted to be connected to the clip 39.

A lead 40 has one end electrically connected to the head 41 of the bolt 35 and its other end electrically connected to the head 42 of a bolt 43 which passes through a tubular insulator 15 carried by the left hand strip 11. A nut 45 holds the bolt 43 in assembled relation.

A thermostatic switch 50 is connected in in-line relation with the bolts 19 and 43 and in series relation with the lead 17 of the top convolution 16 and the lead 40 of the terminal bolt 35. The switch may be of any commercially available type, and thermostat switches manufactured by the Therm-O-Disc Division of Emerson Electric Co., or by Texas Instruments, Inc., have been found suitable for the purpose. A switch illustrative of the type available on the market is shown in FIG. 3, and comprises a body 51 of electric insulating material, such as a suitable plastic. A metal cap 52 surrounds and is fixed to a tubular end of the body and clamps a thin, bimetallic disc 53 between it and the body. As seen in FIG. 3, the disc is normally bowed outwardly. Terminals 54 and 55 are carried by the body 51 in fixed relation. Secured to the terminal 54 is one end of a switch arm 56 which is made of spring metal and is biased downwardly to push a slidably supported dielectric rod 57 against the inside surface of the disc 53. The terminal 55 has an inner, downwardly offset portion which carries a contact point cooperable with a similar point carried at the free end of the switch arm 56. In the position of parts shown in FIG. 3, the contact points are in engagement so that electric current may flow fromone switch terminal to the other.

The bimetallic disc 53 acts as a heat sensor and, as seen in FIG. 1, it is positioned with its major surface directly above the coil reach 21 to be quickly affected by any increase in heat of the coil. In the event the heat generated by the coil is above a predetermined level, the disc will snap over center to the position shown in dotted lines in FIG. 3, and push against the rod 57 to break engagement between the switch contacts. As before stated, the thermostatic switch 50 is of standard construction, and to adapt it for in-line series connection between the bolts 19 and 43, right-angle metal brackets 60,61 are welded to respective switch terminals 54,55. It is to be understood that a switch may be manufactured with switch terminals having right angle ends, to eliminate need for the brackets 60,61.

I claim:

1. An electric heating assembly, comprising a frame formed of a plurality of strips which are connected in laterally spaced relation, conductor terminals carried by one strip and adapted to be connected to a power supply source, an open coil heating element formed in simuous fashion to provide a plurality of reaches held in position extending crosswise of said strips, the end of the reach at one end of said heating element being electrically connected to one terminal, a thermostatic switch disposed between a pair of strips and carried thereby, said switch having contacts movable to various positions to control passage of electrical current, one side of said switch being electrically connected in series relation with the other of said conductor terminals and the other end of said heating element, said thermostatic switch having a bimetallic disc operably connected with said switch contacts, the major surface of said disc facing and being disposed in close proximity to an adjoining reach of said heating element so as to be quickly affected by changes of heat generated by said element, and said disc being adapted to move said switch contacts to a position wherein current supply to said heating element is interrupted when the heat generated by the latter reaches a predetermined temperature.

2. An electric heating assembly, comprising:

a frame an electric heating element supported by said and, and formed to provide a pair of heater lengths in spaced, side-by-side relation, one length being adapted reach electrical connection with one side of a power source, the other length being shorter than said one length, a thermostatic switch having contacts movable to various positions to control passage of electrical current, one terminal of said switch being electrically connected to said shorter length and the other terminal of said switch being adapted to be electrically connected to the other side of said power source, said thermostatic switch having a heat sensor facing and in close proximity to a portion of said one length of said heating element so as to be quickly affected by the changes of heat generated by said element, said sensor being operably connected to said switch contacts to move the latter to a position wherein current supply to said heating element is interrupted when heat generated by the latter reaches a predetermined temperature.

3. The construction according to claim 2 wherein said heating element is an open coil formed to provide a plurality of heater lengths in spaced, side-by-side relation, said shorter length constituting one end of said heating element and said one length being disposed immediately adjacent said shorter length.

4. The construction according to claim 2 wherein said heat sensor is a bimetallic disc with its major surface facing and in close proximity to said one length.

5. An electric heating assembly, comprising:

a frame formed of a plurality of strips which are connected in laterally spaced relation, an open coil heating element formed in sinuous fashion to provide a plurality of reaches extending crosswise of said strips and held in spaced, side-by-side relation, the end of the reach at one end of said heating element being adapted to be electrically connected to one side of a power source, the reach at the other end of said heating element being shorter than the adjoining reach, a thermostatic switch disposed between a pair of strips and carried thereby to occupy a space in juxtaposition with a portion of said adjoining reach, said switch having contacts movable to various positions to control passage of electrical current through said switch, one terminal of said switch being electrically connected to the end of said shorter reach and the other terminal of said switch being adapted to be electrically connected to the other side of said power source, said thermostatic switch having a heat sensor facing and in close proximity to said adjoining reach portion so as to be quickly affected by changes of heat in said portion, said sensor being adapted to move said switch contacts to a position wherein current supply to said heating element is interrupted when the heat from said adjoining reach portion reaches a predetermined temperature.

6. The construction according to claim 5, wherein said heat sensor is a bimetallic disc with its major surface directed toward said adjoining reach portion.

* * * * *

UNITED STATES PATENT OFFICE
CERTIFICATE OF CORRECTION

Patent No. 3,770,939　　　　　　　　　Dated November 6, 1973

Inventor(s) Leonard Dennis Kokjohn

It is certified that error appears in the above-identified patent and that said Letters Patent are hereby corrected as shown below:

Column 3, claim 1, line 12, "simuous" should read -- sinuous --;

claim 2, line 36, delete "and" and insert -- frame --;

line 39, delete "reach" and insert -- for --.

Signed and sealed this 14th day of May 1974.

(SEAL)
Attest:

EDWARD M. FLETCHER, JR.　　　　　　C. MARSHALL DANN
Attesting Officer　　　　　　　　　　Commissioner of Patents